US011902204B2

(12) United States Patent
Sakhnini et al.

(10) Patent No.: US 11,902,204 B2
(45) Date of Patent: Feb. 13, 2024

(54) PHYSICAL DOWNLINK SHARED CHANNEL TRANSMISSION CONFIGURATION INDICATOR STATE MAPPING

(71) Applicant: QUALCOMM Incorporated, San Diego, CA (US)

(72) Inventors: Iyab Issam Sakhnini, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/656,181

(22) Filed: Mar. 23, 2022

(65) Prior Publication Data

US 2023/0308239 A1    Sep. 28, 2023

(51) Int. Cl.
*H04L 5/00* (2006.01)
(52) U.S. Cl.
CPC .................. *H04L 5/0051* (2013.01)
(58) Field of Classification Search
None
See application file for complete search history.

(56) References Cited

U.S. PATENT DOCUMENTS

| 2022/0304023 A1* | 9/2022 | Zhang | H04W 72/23 |
| 2023/0132040 A1* | 4/2023 | Gao | H04W 72/23 |
| | | | 370/329 |
| 2023/0133947 A1* | 5/2023 | Yao | H04L 5/0023 |
| | | | 370/329 |
| 2023/0144103 A1* | 5/2023 | Gao | H04W 72/20 |
| | | | 370/329 |
| 2023/0239125 A1* | 7/2023 | Yi | H04L 5/0048 |
| | | | 370/329 |

FOREIGN PATENT DOCUMENTS

| EP | 3836696 A1 | 6/2021 |
| WO | 2022046717 A1 | 3/2022 |
| WO | 2022152180 A1 | 7/2022 |

OTHER PUBLICATIONS

International Search Report and Written Opinion—PCT/US2023/063141—ISA/EPO—dated Jun. 13, 2023.

\* cited by examiner

*Primary Examiner* — Diane L Lo
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive configuration information identifying a set of transmission configuration indicator (TCI) states and a TCI-field codepoint mapping, wherein an active subset of the set of TCI states is active in accordance with a default configuration. The UE may communicate, based at least in part on the TCI-field codepoint mapping and the default configuration, using a default active TCI state of the active subset of the set of TCI states. Numerous other aspects are provided.

30 Claims, 12 Drawing Sheets

PHYSICAL DOWNLINK SHARED CHANNEL TRANSMISSION CONFIGURATION INDICATOR STATE MAPPING

FIELD OF THE DISCLOSURE

Aspects of the present disclosure generally relate to wireless communication and specifically, to techniques and apparatuses for physical downlink shared channel transmission configuration indicator state mapping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LIE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A UE may receive configuration information identifying a plurality of transmission configuration indicator (TCI) states and a mapping of the plurality of TCI states to codepoints of a downlink control information (DCI) TCI field. For example, the UE may receive first configuration information identifying the plurality of TCI states and whether a TCI field is to be present in a particular format of DCI. Further, the UE may receive second configuration information identifying the mapping. The UE may transmit an acknowledgment for, for example, the second configuration information and apply the mapping a threshold amount of time after transmitting the acknowledgment. In some communications systems, before receiving the second configuration information, the UE may receive DCI with the TCI field and including a grant for a physical downlink shared channel (PDSCH) to convey a synchronization signal block (SSB). However, in such cases, the UE has not yet received information identifying which TCI state and associated beam to track for receiving downlink transmissions.

SUMMARY

Some aspects described herein relate to a method of wireless communication performed by a user equipment (UE). The method may include receiving configuration information identifying a set of transmission configuration indicator (TCI) states and a TCI-field codepoint mapping, wherein an active subset of the set of TCI states is active in accordance with a default configuration. The method may include communicating, based at least in part on the TCI-field codepoint mapping and the default configuration, using a default active TCI state of the active subset of the set of TCI states.

Some aspects described herein relate to a method of wireless communication performed by a network entity. The method may include transmitting configuration information identifying a set of TCI states and a TCI-field codepoint mapping, wherein an active subset of the set of TCI states is active in accordance with a default configuration. The method may include communicating, based at least in part on the TCI-field codepoint mapping and the default configuration, using a default active TCI state of the active subset of the set of TCI states.

Some aspects described herein relate to a UE for wireless communication. The UE may include at least one processor and at least one memory, communicatively coupled with the at least one processor, that stores processor-readable code. The processor-readable code, when executed by the at least one processor, may be configured to cause the UE to receive configuration information identifying a set of TCI states and a TCI-field codepoint mapping, wherein an active subset of the set of TCI states is active in accordance with a default configuration. The processor-readable code, when executed by the at least one processor, may be configured to cause the UE to communicate, based at least in part on the TCI-field codepoint mapping and the default configuration, using a default active TCI state of the active subset of the set of TCI states.

Some aspects described herein relate to a network entity for wireless communication. The network entity may include at least one processor and at least one memory, communicatively coupled with the at least one processor, that stores processor-readable code. The processor-readable code, when executed by the at least one processor, may be configured to cause the network entity to transmit configuration information identifying a set of TCI states and a TCI-field codepoint mapping, wherein an active subset of the set of TCI states is active in accordance with a default configuration. The processor-readable code, when executed by the at least one processor, may be configured to cause the network entity to communicate, based at least in part on the TCI-field codepoint mapping and the default configuration, using a default active TCI state of the active subset of the set of TCI states.

Some aspects described herein relate to a non-transitory computer-readable medium that stores a set of instructions for wireless communication by a UE. The set of instructions, when executed by one or more processors of the UE, may cause the UE to receive configuration information identifying a set of TCI states and a TCI-field codepoint mapping, wherein an active subset of the set of TCI states is active in accordance with a default configuration. The set of instructions, when executed by one or more processors of the UE, may cause the UE to communicate, based at least in part on the TCI-field codepoint mapping and the default configuration, using a default active TCI state of the active subset of the set of TCI states.

Some aspects described herein relate to a non-transitory computer-readable medium that stores a set of instructions for wireless communication by a network entity. The set of instructions, when executed by one or more processors of the network entity, may cause the network entity to transmit configuration information identifying a set of TCI states and a TCI-field codepoint mapping, wherein an active subset of the set of TCI states is active in accordance with a default configuration. The set of instructions, when executed by one or more processors of the base station, may cause the network entity to communicate, based at least in part on the TCI-field codepoint mapping and the default configuration, using a default active TCI state of the active subset of the set of TCI states.

Some aspects described herein relate to an apparatus for wireless communication. The apparatus may include means for receiving configuration information identifying a set of TCI states and a TCI-field codepoint mapping, wherein an active subset of the set of TCI states is active in accordance with a default configuration. The apparatus may include means for communicating, based at least in part on the TCI-field codepoint mapping and the default configuration, using a default active TCI state of the active subset of the set of TCI states.

Some aspects described herein relate to an apparatus for wireless communication. The apparatus may include means for transmitting configuration information identifying a set of TCI states and a TCI-field codepoint mapping, wherein an active subset of the set of TCI states is active in accordance with a default configuration. The apparatus may include means for communicating, based at least in part on the TCI-field codepoint mapping and the default configuration, using a default active TCI state of the active subset of the set of TCI states.

Aspects generally include a method, apparatus, system, computer program product, non-transitory computer-readable medium, user equipment, base station, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
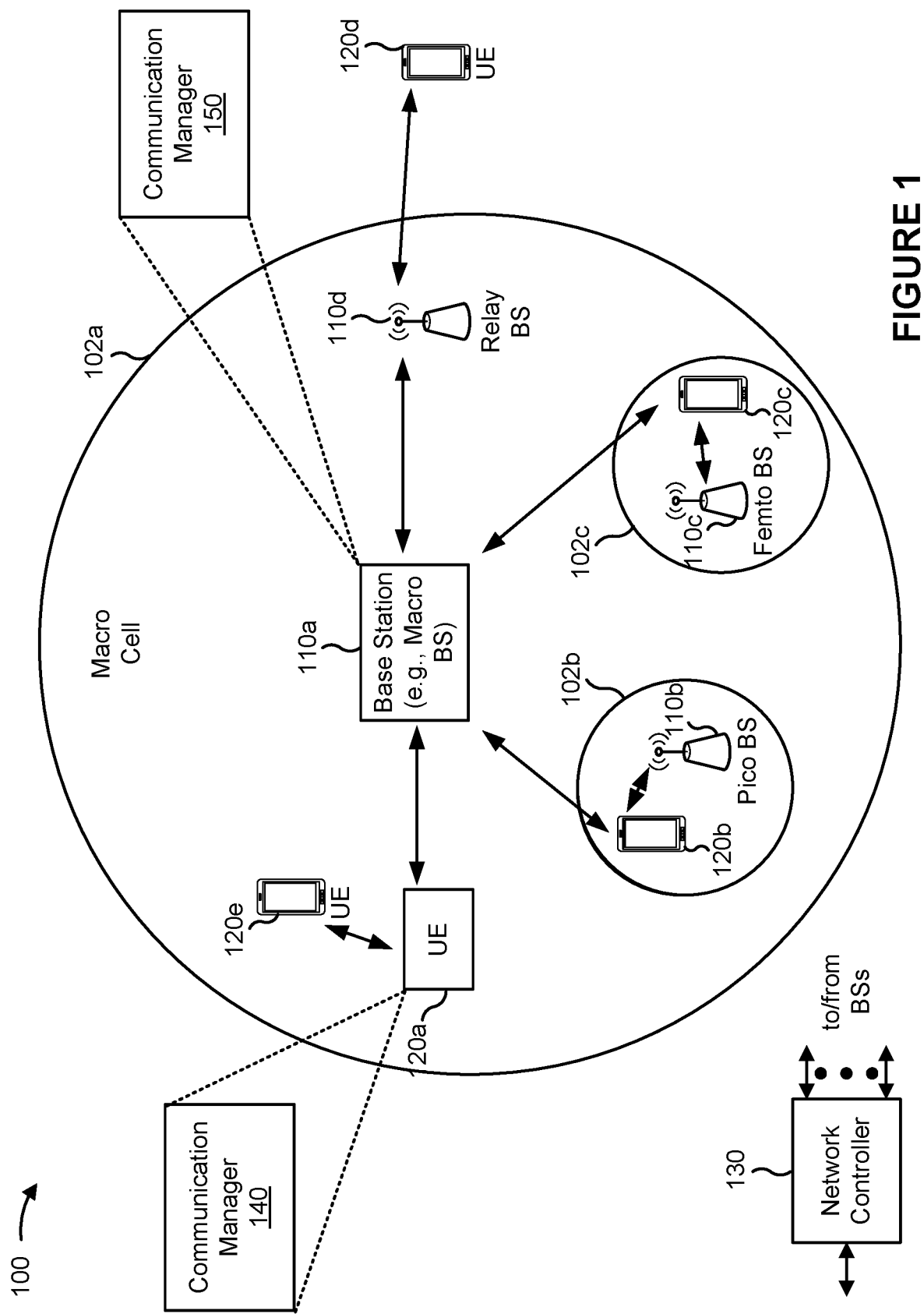
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to transmission configuration indicator (TCI) state mapping. Some aspects more specifically relate to setting a default active TCI state for a UE to use to determine a beam for receiving a downlink transmission from a network entity. In some aspects, a UE may receive, from a network entity, information identifying an active subset of TCI states and may select a default active TCI state for use in communicating with the network entity. The UE may apply a TCI field codepoint mapping a configured amount of time after receiving information identifying the active subset of TCI states.

Particular aspects of the subject matter described in this disclosure can be implemented to realize one or more of the following potential advantages. In some examples, the described techniques can be used to achieve faster narrow beam adoption for PDSCH, which may improve communication performance for the PDSCH. For example, by enabling the UE to select the default active TCI state before receipt of a DCI with a TCI state field, the UE can start tracking active TCI states earlier, thereby enabling receipt of a downlink communication via a narrow beam associated with at least one of the active TCI states rather than with a wide beam.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive configuration information identifying a set of TCI states and a TCI-field codepoint mapping, wherein an active subset of the set of TCI states is active in accordance with a default configuration; and communicate, based at least in part on the TCI-field codepoint mapping and the default configuration, using a default active TCI state of the active subset of the set of TCI states. Additionally or alternatively, the communication manager 140 may perform one or more other operations described herein.

In some aspects, a network entity, such as the base station 110, may include a communication manager 150. As described in more detail elsewhere herein, the communication manager 150 may transmit configuration information identifying a set of TCI states and a TCI-field codepoint mapping, wherein an active subset of the set of TCI states is active in accordance with a default configuration; and communicate, based at least in part on the TCI-field codepoint mapping and the default configuration, using a default active TCI state of the active subset of the set of TCI states. Additionally or alternatively, the communication manager 150 may perform one or more other operations described herein.

Figure 2:
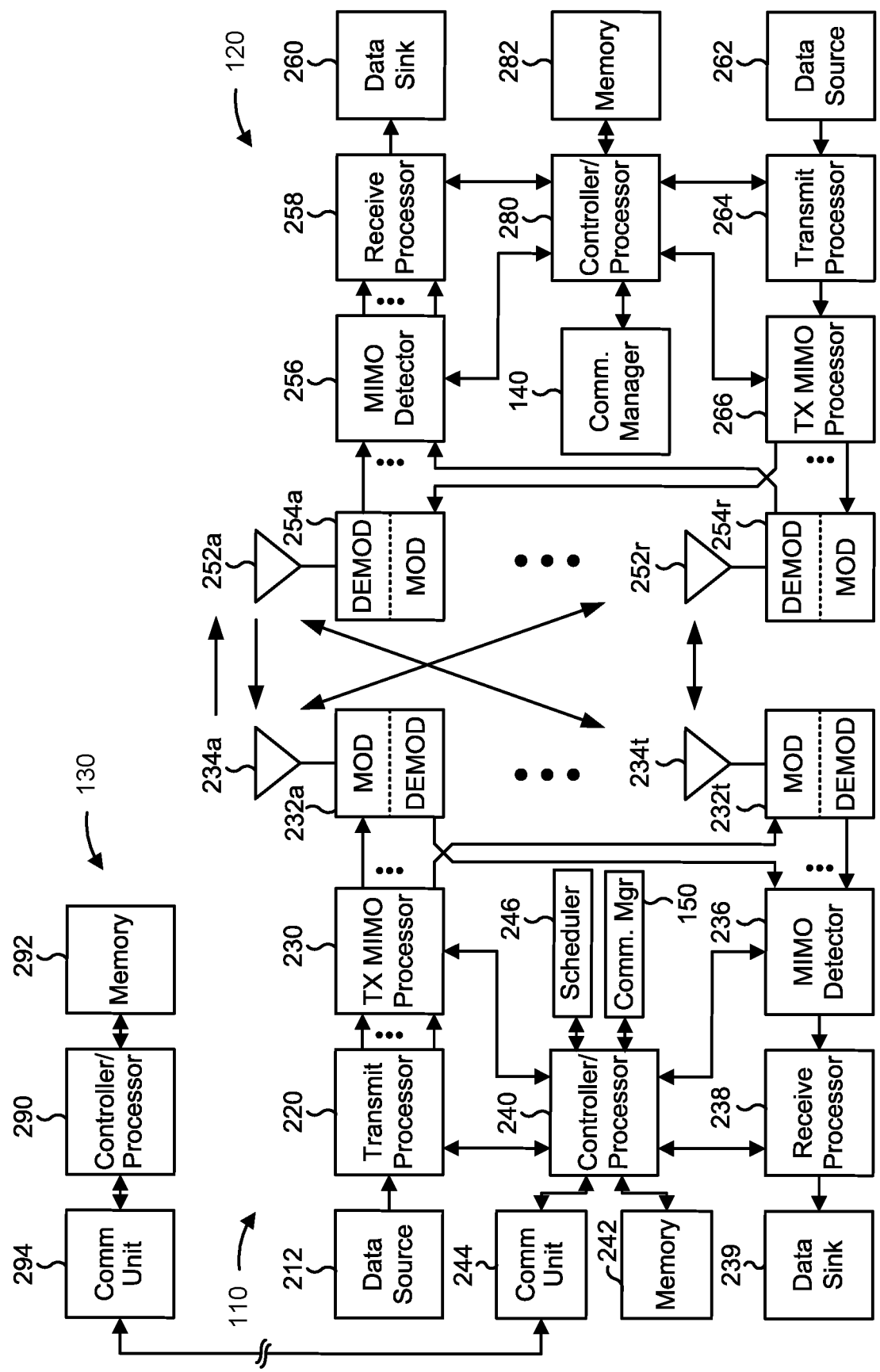
FIG. 2 is a diagram illustrating an example base station in communication with a user equipment (UE) in a wireless network in accordance with the present disclosure.

FIG. 2 is a diagram illustrating an example of a base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with physical downlink shared channel (PDSCH) TCI state mapping, as described in more detail elsewhere herein. In some aspects, the network entity described herein is the base station 110, is included in the base station 110, or includes one or more components of the base station 110 shown in FIG. 2. For example, the controller/processor 240 of the base station 110, the controller/processor 280 of the UE 120, or any other component(s) of FIG. 2 may perform or direct operations of, for example, process 900 of FIG. 9, process 1000 of FIG. 10, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, process 1000 of FIG. 10, or other processes as described herein. In some examples, executing instructions may include running the instructions, converting the instructions, compiling the instructions, or interpreting the instructions, among other examples.

In some aspects, a UE (for example, the UE 120) includes means for receiving configuration information identifying a set of TCI states and a TCI-field codepoint mapping, wherein an active subset of the set of TCI states is active in accordance with a default configuration; or means for communicating, based at least in part on the TCI-field codepoint mapping and the default configuration, using a default active TCI state of the active subset of the set of TCI states. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (for example, the base station 110) includes means for transmitting configuration information identifying a set of TCI states and a TCI-field codepoint mapping, wherein an active subset of the set of TCI states is active in accordance with a default configuration; or means for communicating, based at least in part on the TCI-field codepoint mapping and the default configuration, using a default active TCI state of the active subset of the set of TCI states. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
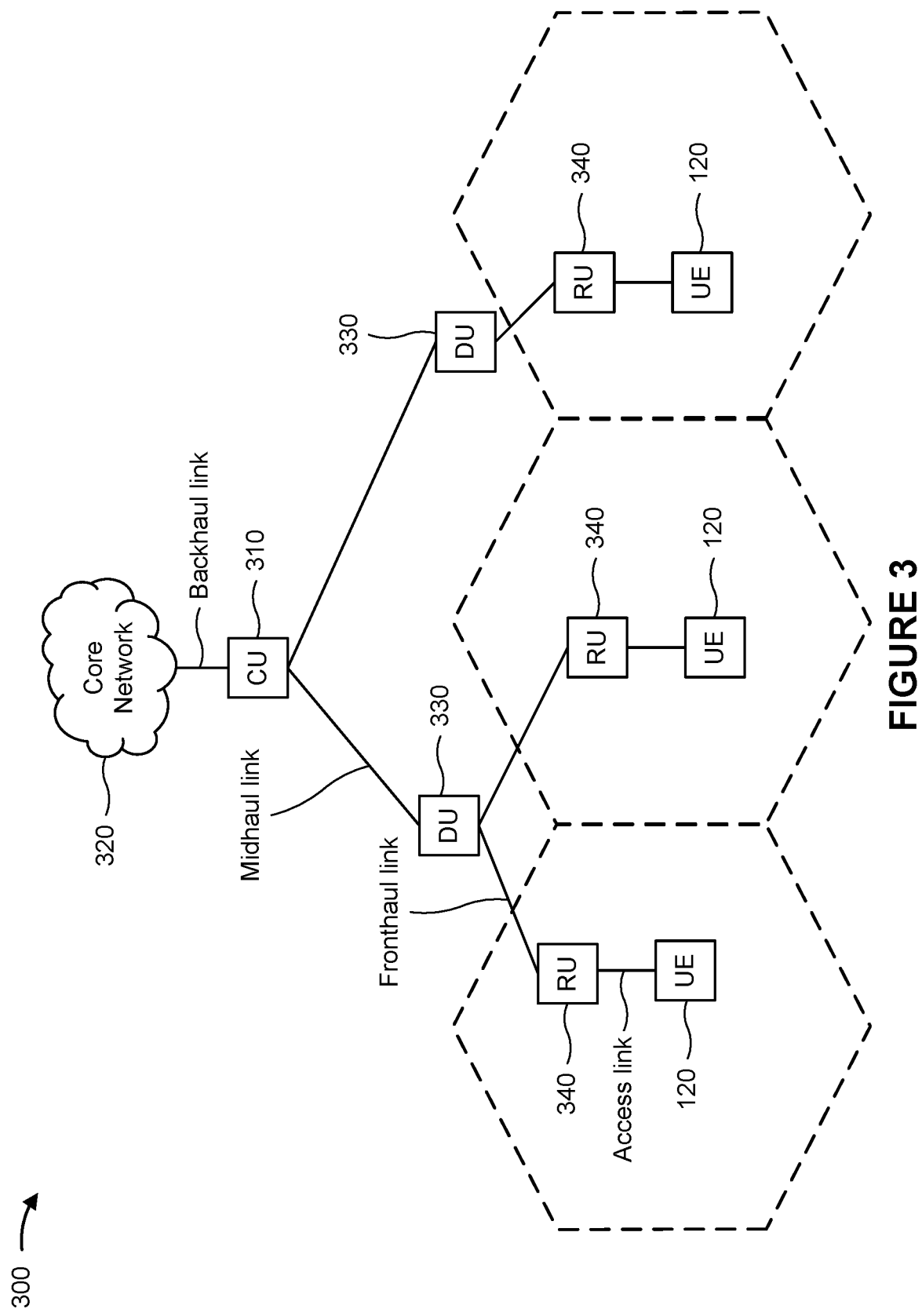
FIG. 3 is a diagram illustrating an example of an open radio access network (RAN) (O-RAN) architecture in accordance with the present disclosure.

FIG. 3 is a diagram illustrating an example 300 of an O-RAN architecture, in accordance with the present disclosure. As shown in FIG. 3, the O-RAN architecture may include a control unit (CU) 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (for example, an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (for example, forward error correction (FEC) encoding and decoding, scrambling, or modulation and demodulation) based at least in part on a lower layer functional split. Higher layer control functions, such as a packet data convergence protocol (PDCP), radio resource control (RRC), or service data adaptation protocol (SDAP), may be hosted by the CU 310. The RU(s) 340 controlled by a DU 330 may correspond to logical nodes that host RF processing functions and low-PHY layer functions (for example, fast Fourier transform (FFT), inverse FFT (iFFT), digital beamforming, or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

Figure 4:
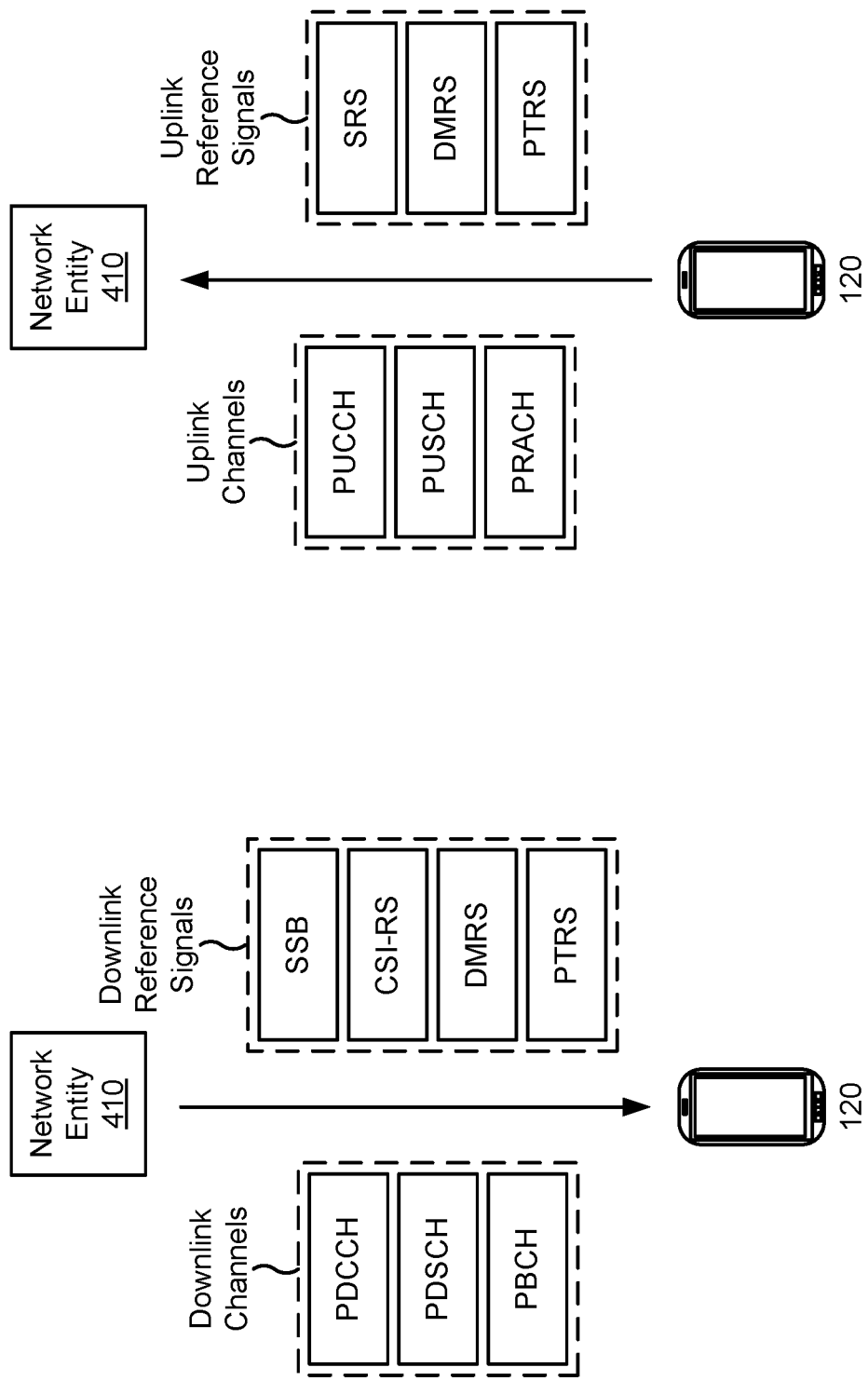
FIG. 4 is a diagram illustrating an example of physical channels and reference signals in a wireless network in accordance with the present disclosure.

FIG. 4 is a diagram illustrating an example of physical channels and reference signals in a wireless network, in accordance with the present disclosure. As shown in FIG. 4, downlink channels and downlink reference signals may carry information from a network entity 410 to a UE 120, and uplink channels and uplink reference signals may carry information from a UE 120 to a network entity 410.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgment (ACK) or negative acknowledgment (NACK) feedback (for example, ACK/NACK feedback or ACK/NACK information) in UCI on the PUCCH or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network entity 410 may transmit multiple SSBs on multiple corresponding beams, and the SSBs may be used for beam selection.

A CSI-RS may carry information used for downlink channel estimation (for example, downlink CSI acquisition), which may be used for scheduling, link adaptation, or beam management, among other examples. The network entity 410 may configure a set of CSI-RSs for the UE 120, and the UE 120 may measure the configured set of CSI-RSs. Based at least in part on the measurements, the UE 120 may perform channel estimation and may report channel estimation parameters to the network entity 410 (for example, in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network entity 410 may use the CSI report to select transmission parameters for downlink communications to the UE 120, such as a number of transmission layers (for example, a rank), a precoding matrix (for example, a precoder), a modulation and coding scheme (MCS), or a refined downlink beam (for example, using a beam refinement procedure or a beam management procedure), among other examples.

A DMRS may carry information used to estimate a radio channel for demodulation of an associated physical channel (for example, PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (for example, rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (for example, on the PDSCH) and uplink communications (for example, on the PUSCH).

A PRS may carry information used to enable timing or ranging measurements of the UE 120 based on signals transmitted by the network entity 410 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (for example, a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (for example, a reference cell and one or more neighbor cells), and may report a reference signal time difference (RSTD) based on OTDOA measurements associated with the PRSs received from the multiple cells. In some aspects, the network entity 410 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 410 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 410 may measure the SRSs, may perform channel estimation based at least in part on the measurements, and may use the SRS measurements to configure communications with the UE 120.

Figure 5:
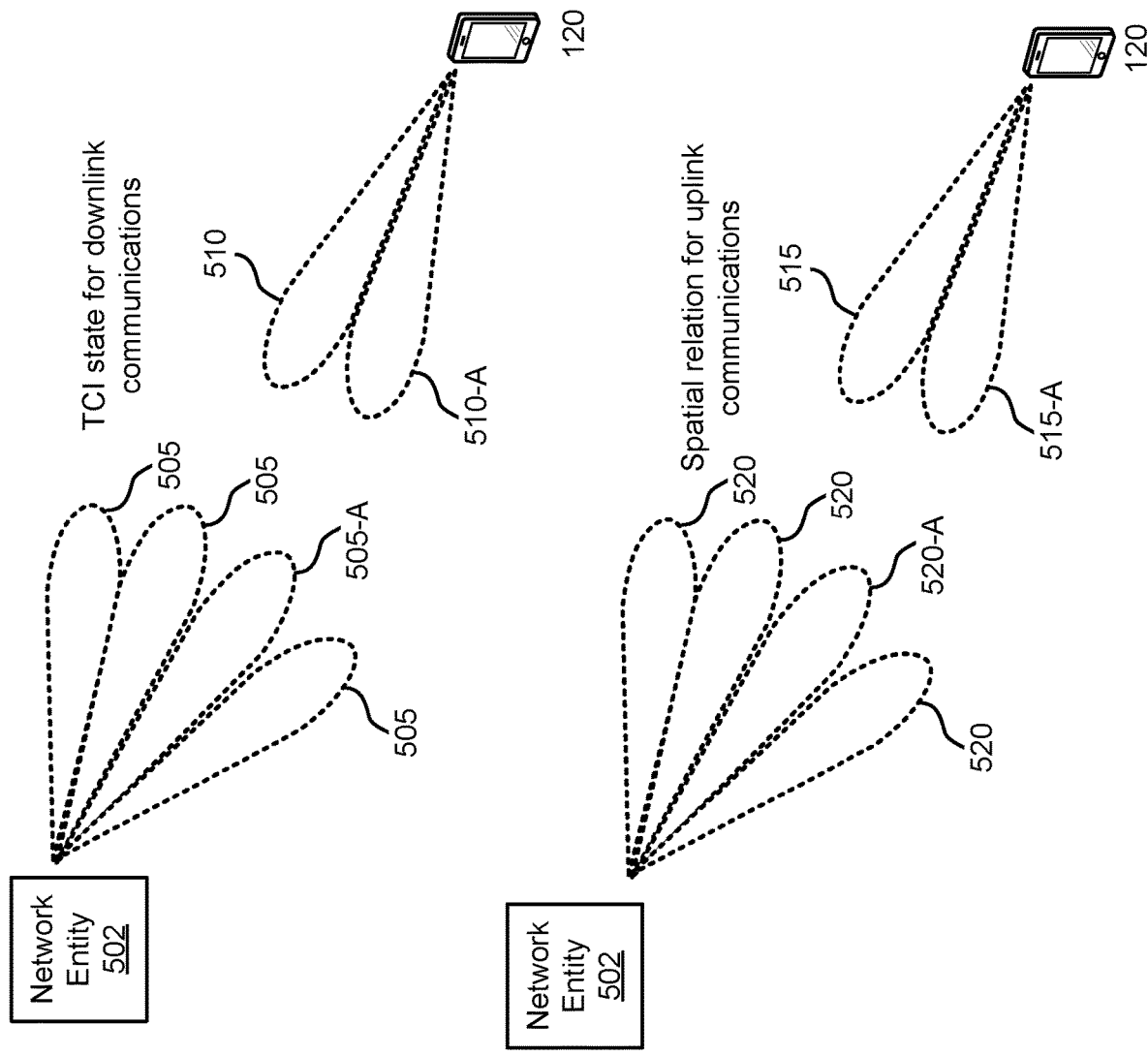
FIG. 5 is a diagram illustrating an example of using beams for communications between a network entity and a UE in accordance with the present disclosure.

FIG. 5 is a diagram illustrating an example of using beams for communications between a network entity and a UE, in accordance with the present disclosure. As shown in FIG. 5, a network entity 502 and a UE 120 may communicate with one another.

The network entity 502 may transmit to UEs 120 located within a coverage area of the network entity 502. The network entity 502 and the UE 120 may be configured for beamformed communications, where the network entity 502 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The network entity 502 may transmit downlink communications via one or more BS transmit beams 505.

The UE 120 may attempt to receive downlink transmissions via one or more UE receive beams 510, which may be configured using different beamforming parameters at receive circuitry of the UE 120. The UE 120 may identify a particular BS transmit beam 505, shown as BS transmit beam 505-A, and a particular UE receive beam 510, shown as UE receive beam 510-A, that provide relatively favorable performance (for example, that have a best channel quality of the different measured combinations of BS transmit beams 505 and UE receive beams 510). In some examples, the UE 120 may transmit an indication of which BS transmit beam 505 is identified by the UE 120 as a preferred BS transmit beam, which the network entity 502 may select for transmissions to the UE 120. The UE 120 may thus attain and maintain a beam pair link (BPL) with the network entity 502 for downlink communications (for example, a combination of the BS transmit beam 505-A and the UE receive beam 510-A), which may be further refined and maintained in accordance with one or more established beam refinement procedures.

A downlink beam, such as a BS transmit beam 505 or a UE receive beam 510, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 505 may be associated with a synchronization signal block (SSB), and the UE 120 may indicate a preferred BS transmit beam 505 by transmitting uplink transmissions in resources of the SSB that are associated with the preferred BS transmit beam 505. A particular SSB may have an associated TCI state (for example, for an antenna port or for beamforming). The network entity 502 may, in some examples, indicate a downlink BS transmit beam 505 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 510 at the UE 120. Thus, the UE 120 may select a corresponding UE receive beam 510 from a set of BPLs based at least in part on the network entity 502 indicating a BS transmit beam 505 via a TCI indication.

The network entity 502 may maintain a set of activated TCI states for downlink shared channel transmissions and a set of activated TCI states for downlink control channel transmissions. The set of activated TCI states for downlink shared channel transmissions may correspond to beams that the network entity 502 uses for downlink transmission on a physical downlink shared channel (PDSCH). The set of activated TCI states for downlink control channel communications may correspond to beams that the network entity 502 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the network entity 502 using a directional UE transmit beam, and the network entity 502 may receive the transmission using a directional BS receive beam. Each UE transmit beam may have an associated beam ID, beam direction, or beam symbols, among other examples. The UE 120 may transmit uplink communications via one or more UE transmit beams 515.

The network entity 502 may receive uplink transmissions via one or more BS receive beams 520. The network entity 502 may identify a particular UE transmit beam 515, shown as UE transmit beam 515-A, and a particular BS receive beam 520, shown as BS receive beam 520-A, that provide relatively favorable performance (for example, that have a best channel quality of the different measured combinations of UE transmit beams 515 and BS receive beams 520). In some examples, the network entity 502 may transmit an indication of which UE transmit beam 515 is identified by the network entity 502 as a preferred UE transmit beam, which the network entity 502 may select for transmissions from the UE 120. The UE 120 and the network entity 502 may thus attain and maintain a BPL for uplink communications (for example, a combination of the UE transmit beam 515-A and the BS receive beam 520-A), which may be further refined and maintained in accordance with one or more established beam refinement procedures. An uplink beam, such as a UE transmit beam 515 or a BS receive beam 520, may be associated with a spatial relation. A spatial relation may indicate a directionality or a characteristic of the uplink beam, similar to one or more QCL properties, as described above.

Figure 6:
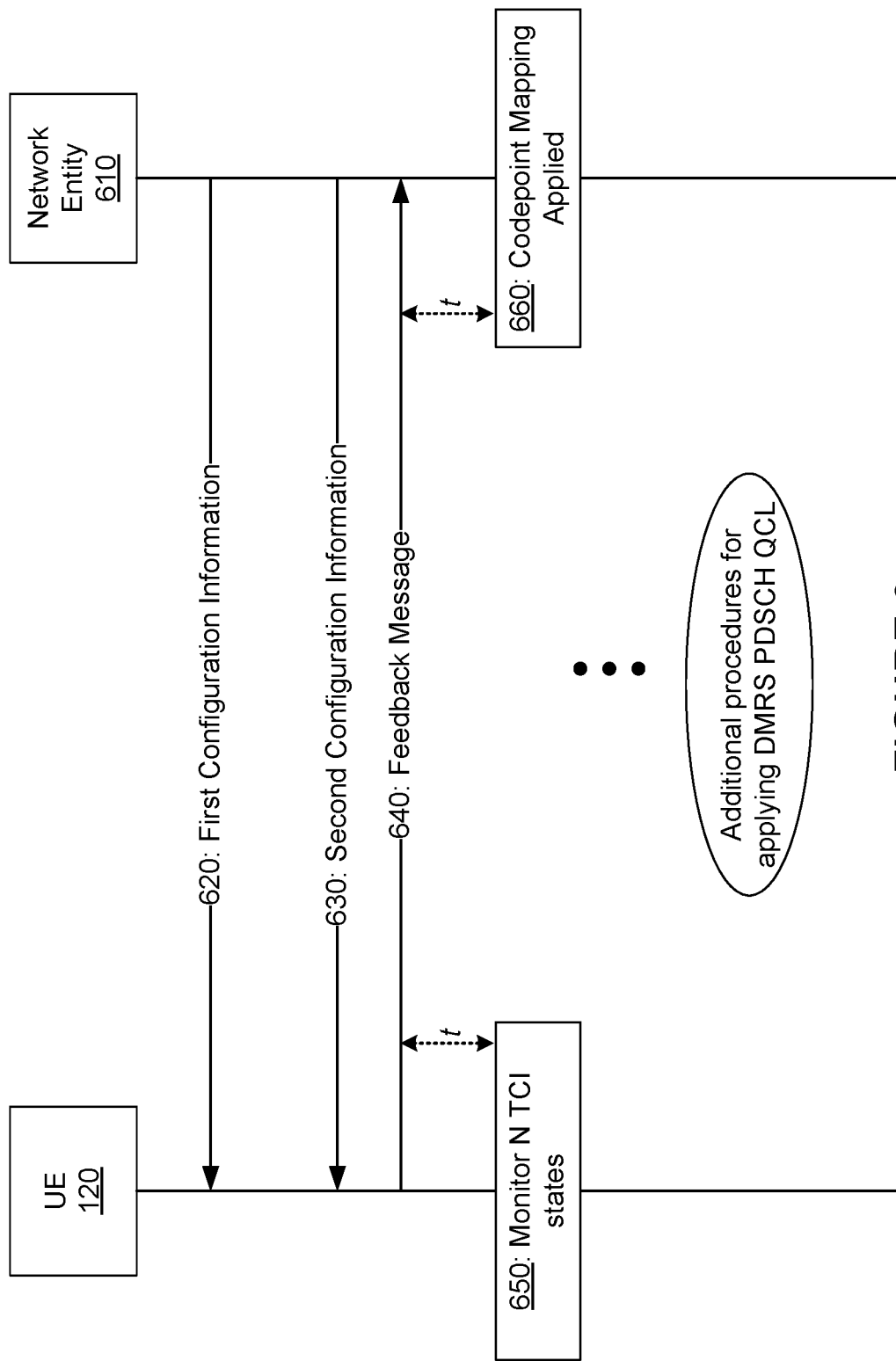
FIG. 6 is a diagram illustrating an example of physical downlink shared channel (PDSCH) quasi-co-location (QCL) in accordance with the present disclosure.

FIG. 6 is a diagram of an example of PDSCH quasi-co-location, in accordance with the present disclosure. As shown in FIG. 6, a network entity 610 may communicate with a UE 120. In some aspects, the network entity 610 and the UE 120 may be part of a wireless network (for example, wireless network 100).

In a first operation 620, the UE 120 may receive first configuration information from the network entity 610. For example, the UE 120 may receive a radio resource control (RRC) configuration message identifying a plurality of TCI states and whether a TCI field is present in a DCI format (for example, a presence or absence of a TCI field for DCI formats other than DCI format 1_0). The quantity, M, of TCI states may be based at least in part on a UE capability of the UE 120.

In a second operation 630, the UE 120 may receive second configuration information identifying a mapping of TCI states to codepoints. For example, the UE 120 may receive a PDSCH medium access control (MAC) control element (CE) (MAC-CE) message identifying a mapping of one or more TCI states, of the plurality of TCI states, to codepoints of a DCI TCI field. The quantity of TCI states, N, that are mapped to codepoints of the DCI TCI field may be based at least in part on a UE capability of the UE 120 (for example, the network entity 610 may configure a mapping of up to 8 TCI states). In such examples, the one or more TCI states that are mapped to codepoints of the DCI TCI field may be active TCI states. In other words, the UE 120 is configured with a set of M TCI states and is subsequently configured such that there is an active subset of N TCI states of the set of M TCI states (where N≤M).

In a third operation 640, the UE 120 may transmit a feedback message as a response to receiving the PDSCH MAC-CE. For example, the UE 120 may transmit a physical uplink control channel (PUCCH) hybrid automatic repeat request (HARQ) acknowledgment (ACK) (HARQ-ACK) to indicate receipt of the PDSCH MAC-CE in a slot n.

In fourth and fifth operations 650 and 660, respectively, the UE 120 may apply the mapping of TCI states to codepoints of the DCI TCI field and track the active subset of TCI states. For example, a threshold period of time after transmitting the PUCCH HARQ-ACK, the UE 120 may apply the mapping and start tracking the active subset of N TCI states. In such examples, after applying the mapping, the UE 120 can monitor for beams associated with the N TCI states and receive signals (or transmit signals) on the beams associated with the N TCI states. The threshold period of time (for example, approximately 3 milliseconds (ms)), t, after the transmission of the PUCCH HARQ-ACK may be based at least in part on a subcarrier spacing for the PUCCH. For example, the UE 120 may apply the codepoint mapping after slot $n+3N_{slot}^{subframe,\mu}$ where $\mu$ represents a subcarrier spacing of the PUCCH. After applying the codepoint mapping, the UE 120 may perform additional procedures to determine demodulation reference signal (DMRS) PDSCH quasi-co-location with one or more beams.

Figure 7:
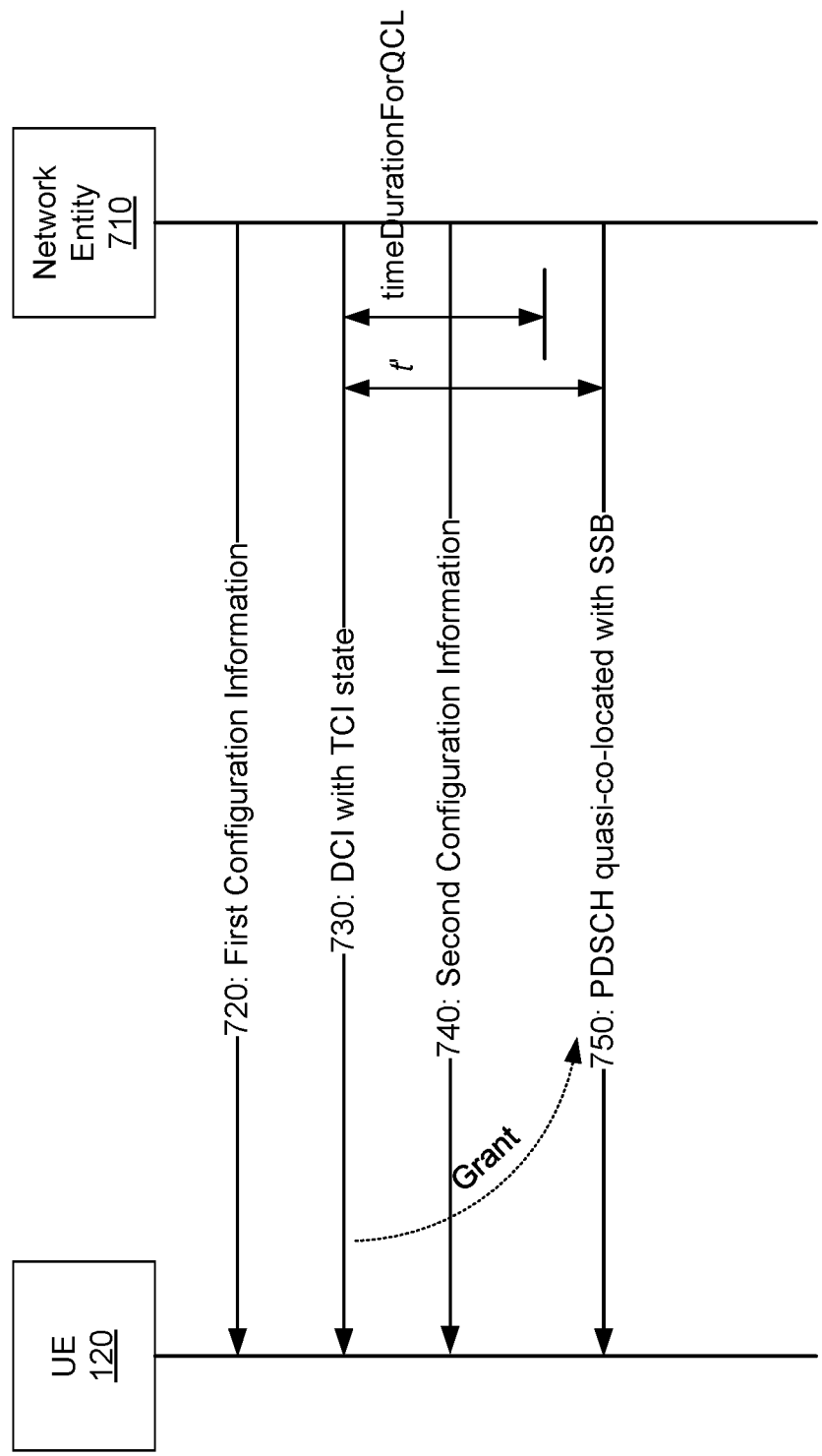
FIG. 7 is a diagram illustrating an example of PDSCH QCL in accordance with the present disclosure.

FIG. 7 is a diagram of an example of PDSCH quasi-co-location, in accordance with the present disclosure. As shown in FIG. 7, a network entity 710 may communicate with a UE 120. In some aspects, the network entity 710 and the UE 120 may be part of a wireless network (for example, wireless network 100).

In a first operation 720, the UE 120 may receive first configuration information. For example, as described above, the UE 120 may receive, from the network entity 710, an RRC configuration identifying a set of M TCI states and indicating that a TCI field is present in a DCI with a particular DCI format.

In second, third, and fourth operations 730, 740, and 750, respectively, before receiving second configuration information (for example, the PDSCH with the MAC-CE indicating the N active TCI states), the UE 120 may receive, from the network entity 710, DCI with a TCI state indicated in a TCI state field. The DCI may include a grant associated with a PDSCH, which is quasi-co-located with an SSB selected during an initial access procedure. The grant may be at a time that occurs a threshold amount of time, t', after the DCI (for example, the PDSCH is offset from the DCI by t'). For example, the grant may indicate a resource for receiving a PDSCH at a time such that t'≥timeDurationForQCL, where timeDurationForQCL is a parameter related to enabling quasi-co-location between the identified PDSCH and the SSB selected during the initial access procedure. As a result, a wide beam is used for the PDSCH, as the MAC-CE has not been received, before the DCI, to activate TCI states (for example, for using a narrow beam for the PDSCH).

Various aspects relate generally to enabling use of a default active TCI state for receiving a downlink transmission. Some aspects more specifically relate to a UE that may receive information identifying active TCI states in RRC configuration information, which may enable the UE to select a default active TCI state for receiving a downlink transmission (for example, a PDSCH quasi-co-located with a downlink reference signal).

Particular aspects of the subject matter described in this disclosure can be implemented to realize one or more of the following potential advantages. In some examples, the described techniques can be used to enable the UE to adopt a narrow beam faster than occurs when the UE waits for a MAC-CE to configure active TCI states, thereby improving communication performance.

Figure 8:
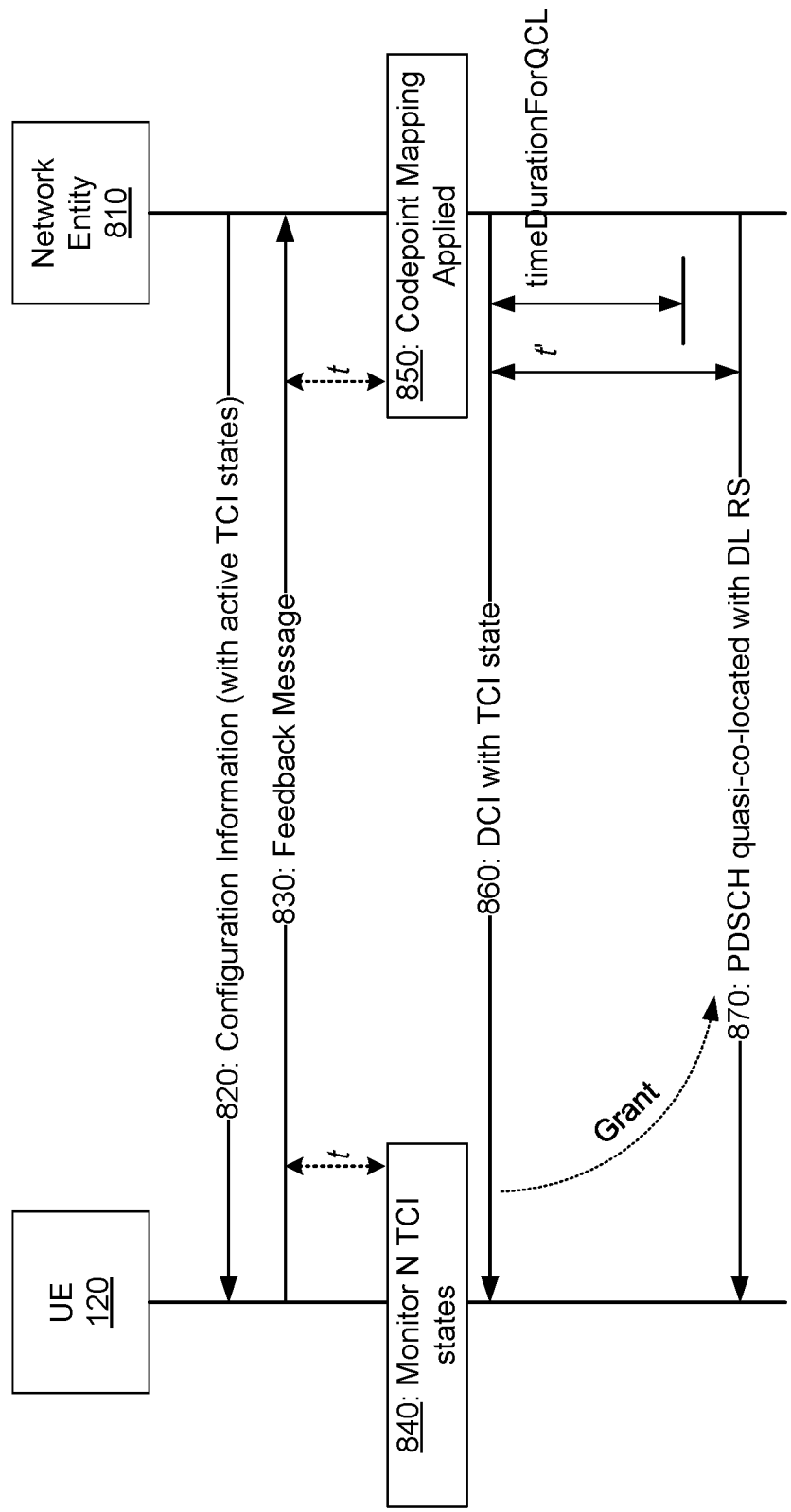
FIG. 8 is a diagram illustrating an example associated with PDSCH transmission configuration indicator (TCI) state mapping in accordance with the present disclosure.

FIG. 8 is a diagram of an example of PDSCH quasi-co-location, in accordance with the present disclosure. As shown in FIG. 8, a network entity 810 may communicate with a UE 120. In some aspects, the network entity 810 and the UE 120 may be part of a wireless network (for example, wireless network 100).

In a first operation 820, the UE 120 may receive configuration information from the network entity 810. For example, the UE 120 may receive an RRC configuration message identifying a set of TCI states and whether a TCI field is present in a DCI format (for example, a presence or absence of a TCI field for DCI formats other than DCI format 1_0). The quantity, M, of TCI states may be based at least in part on a UE capability of the UE 120. In some aspects, the configuration information may include information identifying an active subset of the set TCI states. For example, the configuration information may identify N active TCI states of the M total TCI states. In some aspects, the UE 120 may determine the N active TCI states based at least in part on a stored configuration. For example, the UE 120 may select a first N TCI states, of the M total TCI states, as active TCI states. Additionally or alternatively, the UE 120 may select N TCI states with lowest respective TCI state codepoint indices of the M TCI states. In some aspects, the network entity 810 may provide, in the configuration information, an indication of which N TCI states to select, such as an indication of whether to select the first N TCI states or the N TCI states with the lowest respective TCI state codepoint indices. Additionally or alternatively, the network entity 810 may provide, in the configuration information, an indication of a value for N. For example, the network entity 810 may, based at least part on a UE capability of the UE 120, indicate that the UE 120 is to select a particular quantity of TCI states as active TCI states.

In a second operation 830, the UE 120 may transmit a feedback message as a response to receiving the configuration information. For example, the UE 120 may transmit a PUCCH HARQ-ACK to indicate receipt of the configuration information identifying the M TCI states and the N active subset of TCI states in a slot n.

In a third operation 840 and a fourth operation 850, respectively, the UE 120 and the network entity 810 may apply the mapping of TCI states to codepoints of the DCI TCI field and track (for example, monitor) the active subset of TCI states. For example, a threshold period of time, t, after transmitting the PUCCH HARQ-ACK, the UE 120 may apply the mapping and start tracking the active subset of N TCI states. In some aspects, the UE 120 may apply the codepoint mapping after slot $n+3N_{slot}^{subframe,\mu}$, where slot n represents the slot in which the UE 120 transmits the PUCCH HARQ-ACK for the RRC configuration message. In such examples, after applying the mapping, the UE 120 can monitor for beams associated with the N TCI states and receive signals (or transmit signals) on the beams associated with the N TCI states.

In a fifth operation 860 and a sixth operation 870, respectively, the UE 120 may receive, from the network entity 810, DCI with a TCI state indicated in a TCI state field. The DCI may include a grant associated with a PDSCH, which is quasi-co-located with a downlink (DL) reference signal (RS), such as an SSB or a channel state information (CSI) RS (CSI-RS). The grant may be at a time that occurs a threshold amount of time, t', after the DCI (for example, the PDSCH is offset from the DCI by t'). In such examples, based at least in part on the UE 120 and the network entity 810 having started monitoring the N active TCI states, the UE 120 may receive the PDSCH and the downlink reference signal using a beam associated with a default active TCI state of the N active TCI states. In some aspects, the DCI may include an indication of the default active TCI state in which to receive the PDSCH and the quasi-co-located downlink reference signal. For example, the TCI field of the DCI may include an indication of one of the N active TCI states to use as the default active TCI state. In such examples, if a timing for applying the mapping is satisfied (for example, the DCI is received after the mapping is applied) and there is a threshold amount of time between the DCI and the PDSCH (for example, t'≥timeDurationForQCL, as shown), the UE 120 may apply the TCI state identified in the DCI (for example, use a beam associated with the TCI state for receiving the PDSCH or the quasi-co-located reference signal). Additionally or alternatively, if the timing for applying the mapping is not satisfied and there is a threshold amount of time between the DCI and the PDSCH, then the PDSCH is quasi-co-located with an SSB and the UE 120 may use a beam selected during an initial access procedure. In some aspects, the beam is a narrow beam, thereby providing improved communication performance relative to using a wide beam, as described above.

Figure 9:
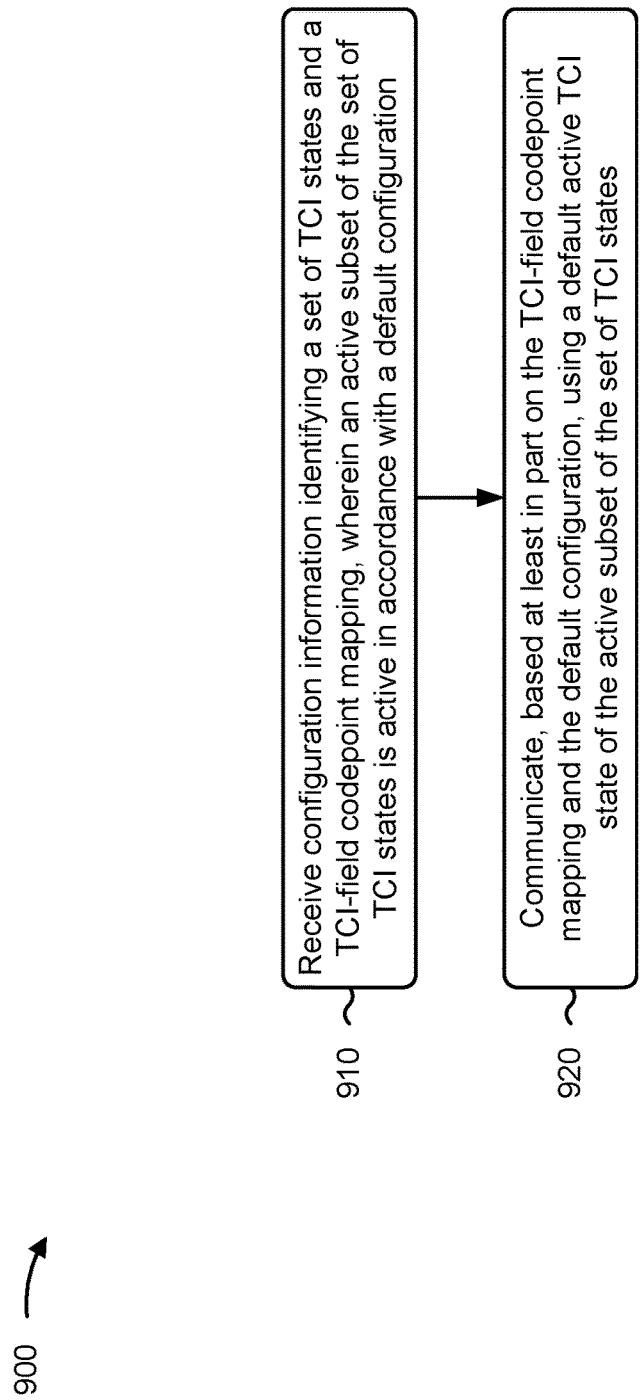
FIG. 9 is a flowchart illustrating an example process performed, for example, by a UE in accordance with the present disclosure.

FIG. 9 is a flowchart illustrating an example process 900 performed, for example, by a UE in accordance with the present disclosure. Example process 900 is an example where the UE (for example, the UE 120) performs operations associated with PDSCH TCI state mapping.

As shown in FIG. 9, in some aspects, process 900 may include receiving configuration information identifying a set of TCI states and a TCI-field codepoint mapping, wherein an active subset of the set of TCI states is active in accordance with a default configuration (block 910). For example, the UE (such as by using communication manager 140 or reception component 1102, depicted in FIG. 11) may receive configuration information identifying a set of TCI states and a TCI-field codepoint mapping, wherein an active subset of the set of TCI states is active in accordance with a default configuration, as described above.

As further shown in FIG. 9, in some aspects, process 900 may include communicating, based at least in part on the TCI-field codepoint mapping and the default configuration, using a default active TCI state of the active subset of the set of TCI states (block 920). For example, the UE (such as by using communication manager 140, reception component 1102 or transmission component 1104, depicted in FIG. 11) may communicate, based at least in part on the TCI-field codepoint mapping and the default configuration, using a default active TCI state of the active subset of the set of TCI states, as described above.

Process 900 may include additional aspects, such as any single aspect or any combination of aspects described below or in connection with one or more other processes described elsewhere herein.

In a first additional aspect, receiving the configuration information comprises receiving the configuration information in radio resource control signaling.

In a second additional aspect, alone or in combination with the first aspect, the active subset of the set of TCI states includes a sequentially first one or more TCI states based at least in part on the default configuration.

In a third additional aspect, alone or in combination with one or more of the first and second aspects, the active subset of the set of TCI states includes one or more default active TCI states with one or more lowest TCI state codepoint indices in the TCI-field codepoint mapping.

In a fourth additional aspect, alone or in combination with one or more of the first through third aspects, a quantity of default active TCI states in the active subset of the set of TCI states is based at least in part on the configuration information.

In a fifth additional aspect, alone or in combination with one or more of the first through fourth aspects, communicating using the default active TCI state comprises receiving a downlink transmission using the default active TCI state in accordance with a timing criterion for applying the TCI-field codepoint mapping.

In a sixth additional aspect, alone or in combination with one or more of the first through fifth aspects, the timing criterion is a threshold amount of time after receiving the configuration information.

In a seventh additional aspect, alone or in combination with one or more of the first through sixth aspects, process 900 includes transmitting an acknowledgment message associated with receiving the configuration information, wherein the timing criterion is a threshold amount of time after transmitting the acknowledgment message associated with receiving the configuration information.

In an eighth additional aspect, alone or in combination with one or more of the first through seventh aspects, process 900 includes receiving downlink control information with a transmission configuration indicator field identifying at least one TCI state of the active subset of the set of TCI states based at least in part on the timing criterion being satisfied.

In a ninth additional aspect, alone or in combination with one or more of the first through eighth aspects, the default active TCI state for a downlink transmission is based at least in part on the at least one TCI state of the active subset of the set of TCI states identified in the transmission configuration indicator field of the downlink control information.

In a tenth additional aspect, alone or in combination with one or more of the first through ninth aspects, communicating comprises receiving a downlink transmission that is quasi-co-located with a synchronization signal block associated with an initial access procedure.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
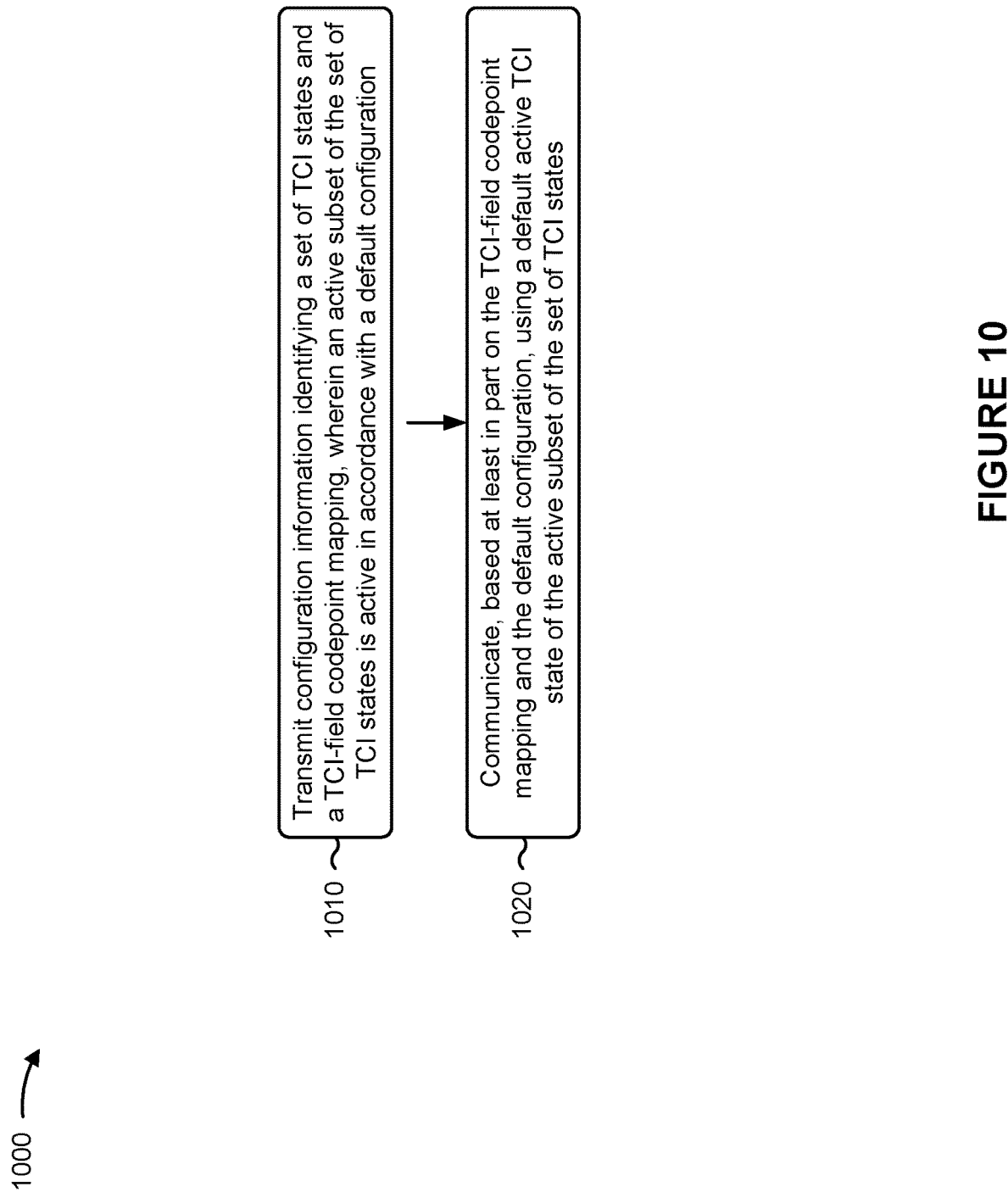
FIG. 10 is a flowchart illustrating an example process performed, for example, by a network entity in accordance with the present disclosure.

FIG. 10 is a flowchart illustrating an example process 1000 performed, for example, by a network entity in accordance with the present disclosure. Example process 1000 is an example where the network entity (for example, the base station 110, the CU 310, the DU 330, the RU 340, the network entity 410/502/610/710/810, among other examples) performs operations associated with PDSCH TCI state mapping.

As shown in FIG. 10, in some aspects, process 1000 may include transmitting configuration information identifying a set of TCI states and a TCI-field codepoint mapping, wherein an active subset of the set of TCI states is active in accordance with a default configuration (block 1010). For example, the base station (such as by using communication manager 150 or transmission component 1204, depicted in FIG. 12) may transmit configuration information identifying a set of TCI states and a TCI-field codepoint mapping, wherein an active subset of the set of TCI states is active in accordance with a default configuration, as described above.

As further shown in FIG. 10, in some aspects, process 1000 may include communicating, based at least in part on the TCI-field codepoint mapping and the default configuration, using a default active TCI state of the active subset of the set of TCI states (block 1020). For example, the base station (such as by using communication manager 150, reception component 1202 or transmission component 1204, depicted in FIG. 12) may communicate, based at least in part on the TCI-field codepoint mapping and the default configuration, using a default active TCI state of the active subset of the set of TCI states, as described above.

Process 1000 may include additional aspects, such as any single aspect or any combination of aspects described below or in connection with one or more other processes described elsewhere herein.

In a first additional aspect, transmitting the configuration information comprises transmitting the configuration information in radio resource control signaling.

In a second additional aspect, alone or in combination with the first aspect, the active subset of the set of TCI states includes a sequentially first one or more TCI states based at least in part on the default configuration.

In a third additional aspect, alone or in combination with one or more of the first and second aspects, the active subset of the set of TCI states includes one or more default active TCI states with one or more lowest TCI state codepoint indices in the TCI-field codepoint mapping.

In a fourth additional aspect, alone or in combination with one or more of the first through third aspects, a quantity of default active TCI states in the active subset of the set of TCI states is based at least in part on the configuration information.

In a fifth additional aspect, alone or in combination with one or more of the first through fourth aspects, communicating using the default active TCI state comprises transmitting a downlink transmission using the default active TCI state in accordance with a timing criterion for applying the TCI-field codepoint mapping.

In a sixth additional aspect, alone or in combination with one or more of the first through fifth aspects, the timing criterion is a threshold amount of time after receiving the configuration information.

In a seventh additional aspect, alone or in combination with one or more of the first through sixth aspects, process 1000 includes receiving an acknowledgment message associated with transmitting the configuration information, wherein the timing criterion is a threshold amount of time after receiving the acknowledgment message associated with transmitting the configuration information.

In an eighth additional aspect, alone or in combination with one or more of the first through seventh aspects, process 1000 includes transmitting downlink control information with a transmission configuration indicator field identifying at least one TCI state of the active subset of the set of TCI states based at least in part on the timing criterion being satisfied.

In a ninth additional aspect, alone or in combination with one or more of the first through eighth aspects, the default active TCI state for a downlink transmission is based at least in part on the at least one TCI state of the active subset of the set of TCI states identified in the transmission configuration indicator field of the downlink control information.

In a tenth additional aspect, alone or in combination with one or more of the first through ninth aspects, communicating comprises transmitting a downlink transmission that is quasi-co-located with a synchronization signal block associated with an initial access procedure.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
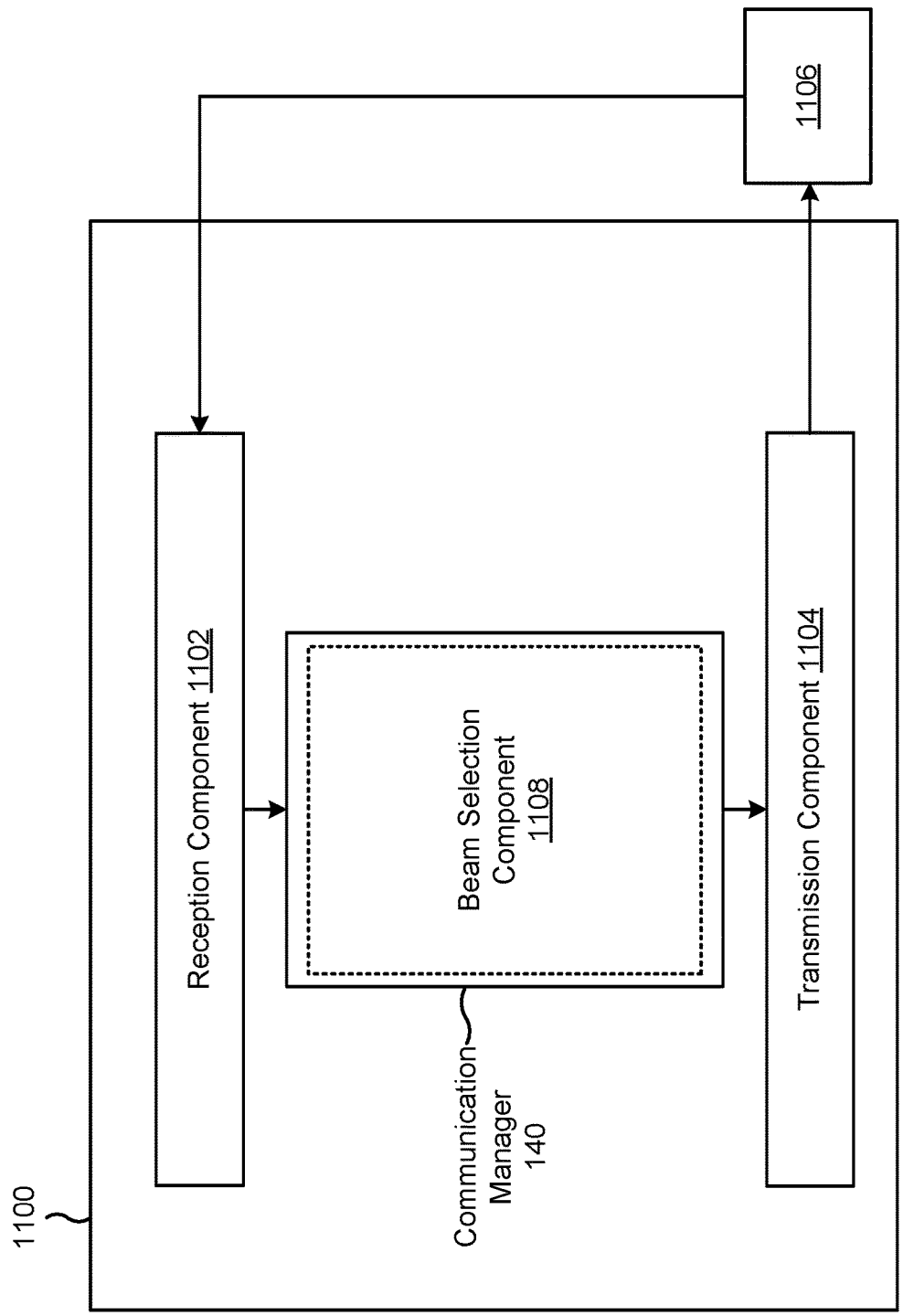
FIGS. 11-12 are diagrams of example apparatuses for wireless communication in accordance with the present disclosure.

FIG. 11 is a diagram of an example apparatus 1100 for wireless communication in accordance with the present disclosure. The apparatus 1100 may be a UE, or a UE may include the apparatus 1100. In some aspects, the apparatus 1100 includes a reception component 1102, a transmission component 1104, and a communication manager 140, which may be in communication with one another (for example, via one or more buses). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIG. 8. Additionally or alternatively, the apparatus 1100 may be configured to perform one or more processes described herein, such as process 900 of FIG. 9. In some aspects, the apparatus 1100 may include one or more components of the UE described above in connection with FIG. 2.

The reception component 1102 may receive communications, such as reference signals, control information, data communications, or a combination thereof, from the apparatus 1106. The reception component 1102 may provide received communications to one or more other components of the apparatus 1100, such as the communication manager 140. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a modem, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, the communication manager 140 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The communication manager 140 may receive or may cause the reception component 1102 to receive configuration information identifying a set of TCI states and a TCI-field codepoint mapping, wherein an active subset of the set of TCI states is active in accordance with a default configuration. The communication manager 140 may communicate, based at least in part on the TCI-field codepoint mapping and the default configuration, using a default active TCI state of the active subset of the set of TCI states. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a beam selection component 1108. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive configuration information identifying a set of TCI states and a TCI-field codepoint mapping, wherein an active subset of the set of TCI states is active in accordance with a default configuration. The reception component 1102 or the transmission component 1104 may communicate, based at least in part on the TCI-field codepoint mapping and the default configuration, using a default active TCI state of the active subset of the set of TCI states. The beam selection component 1108 may select a beam based at least in part on the default active TCI state.

The transmission component 1104 may transmit an acknowledgment message associated with receiving the configuration information, wherein the timing criterion is a threshold amount of time after transmitting the acknowledgment message associated with receiving the configuration information.

The reception component 1102 may receive downlink control information with a transmission configuration indicator field identifying at least one TCI state of the active subset of the set of TCI states based at least in part on the timing criterion being satisfied.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
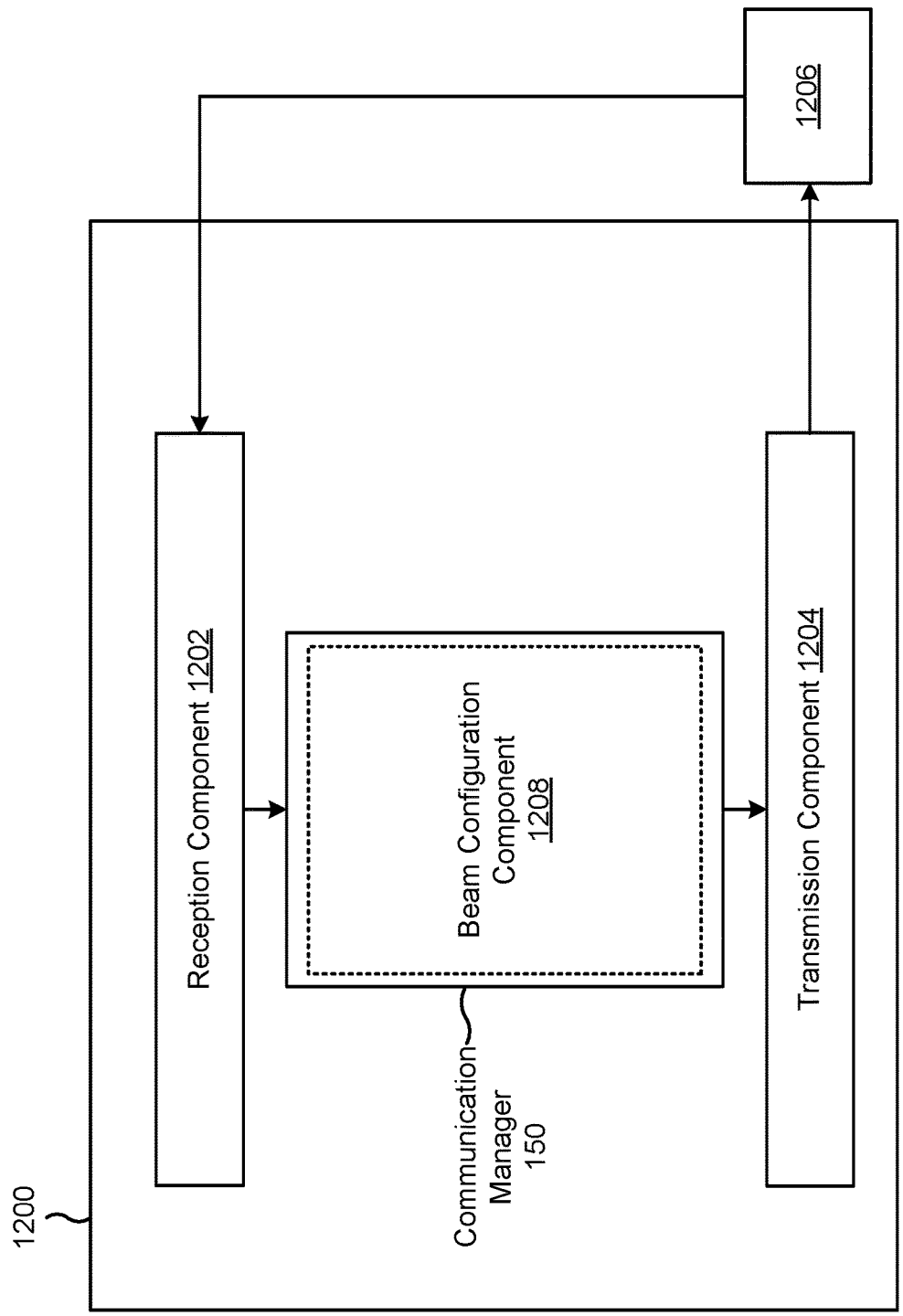

FIG. 12 is a diagram of an example apparatus 1200 for wireless communication in accordance with the present disclosure. The apparatus 1200 may be a network entity, or a network entity may include the apparatus 1200. In some aspects, the apparatus 1200 includes a reception component 1202, a transmission component 1204, and a communication manager 150, which may be in communication with one another (for example, via one or more buses). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIG. 8. Additionally or alternatively, the apparatus 1200 may be configured to perform one or more processes described herein, such as process 1000 of FIG. 10. In some aspects, the apparatus 1200 may include one or more components of the network entity described above in connection with FIG. 2.

The reception component 1202 may receive communications, such as reference signals, control information, data communications, or a combination thereof, from the apparatus 1206. The reception component 1202 may provide received communications to one or more other components of the apparatus 1200, such as the communication manager 150. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, a memory, or a combination thereof, of the network entity described above in connection with FIG. 2.

The transmission component 1204 may transmit communications, such as reference signals, control information, data communications, or a combination thereof, to the apparatus 1206. In some aspects, the communication manager 150 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network entity described above in connection with FIG. 2. In some aspects, the transmission component 1204 may be co-located with the reception component 1202 in a transceiver.

The communication manager 150 may transmit or may cause the transmission component 1204 to transmit configuration information identifying a set of TCI states and a TCI-field codepoint mapping, wherein an active subset of the set of TCI states is active in accordance with a default configuration. The communication manager 150 may communicate, based at least in part on the TCI-field codepoint mapping and the default configuration, using a default active TCI state of the active subset of the set of TCI states. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network entity described above in connection with FIG. 2. In some aspects, the communication manager 150 includes a set of components, such as a beam configuration component 1208. Alternatively, the set of components may be separate and distinct from the communication manager 150. In some aspects, one or more components of the set of components may include or may be implemented within a controller/processor, a memory, a scheduler, a communication unit, or a combination thereof, of the network entity described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1204 may transmit configuration information identifying a set of TCI states and a TCI-field codepoint mapping, wherein an active subset of the set of TCI states is active in accordance with a default configuration. The reception component 1202 or the transmission component 1204 may communicate, based at least in part on the TCI-field codepoint mapping and the default configuration, using a default active TCI state of the active subset of the set of TCI states. The beam configuration component 1208 may configure an indication of a TCI state to enable a beam selection by the apparatus 1206.

The reception component 1202 may receive an acknowledgment message associated with transmitting the configuration information, wherein the timing criterion is a threshold amount of time after receiving the acknowledgment message associated with transmitting the configuration information.

The transmission component 1204 may transmit downlink control information with a transmission configuration indicator field identifying at least one TCI state of the active subset of the set of TCI states based at least in part on the timing criterion being satisfied.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving configuration information identifying a set of transmission configuration indicator (TCI) states and a TCI-field codepoint mapping, wherein an active subset of the set of TCI states is active in accordance with a default configuration; and communicating, based at least in part on the TCI-field codepoint mapping and the default configuration, using a default active TCI state of the active subset of the set of TCI states.

Aspect 2: The method of Aspect 1, wherein receiving the configuration information comprises: receiving the configuration information in radio resource control signaling.

Aspect 3: The method of any of Aspects 1 to 2, wherein the active subset of the set of TCI states includes a sequentially first one or more TCI states based at least in part on the default configuration.

Aspect 4: The method of any of Aspects 1 to 3, wherein the active subset of the set of TCI states includes one or more default active TCI states with one or more lowest TCI state codepoint indices in the TCI-field codepoint mapping.

Aspect 5: The method of any of Aspects 1 to 4, wherein a quantity of default active TCI states in the active subset of the set of TCI states is based at least in part on the configuration information.

Aspect 6: The method of any of Aspects 1 to 5, wherein communicating using the default active TCI state comprises: receiving a downlink transmission using the default active TCI state in accordance with a timing criterion for applying the TCI-field codepoint mapping.

Aspect 7: The method of Aspect 6, wherein the timing criterion is a threshold amount of time after receiving the configuration information.

Aspect 8: The method of Aspect 6, further comprising: transmitting an acknowledgment message associated with receiving the configuration information, wherein the timing criterion is a threshold amount of time after transmitting the acknowledgment message associated with receiving the configuration information.

Aspect 9: The method of Aspect 6, further comprising: receiving downlink control information with a transmission configuration indicator field identifying at least one TCI state of the active subset of the set of TCI states based at least in part on the timing criterion being satisfied.

Aspect 10: The method of Aspect 9, wherein the default active TCI state for a downlink transmission is based at least in part on the at least one TCI state of the active subset of the set of TCI states identified in the transmission configuration indicator field of the downlink control information.

Aspect 11: The method of any of Aspects 1 to 10, wherein communicating comprises: receiving a downlink transmission that is quasi-co-located with a synchronization signal block associated with an initial access procedure.

Aspect 12: A method of wireless communication performed by a network entity, comprising: transmitting configuration information identifying a set of transmission configuration indicator (TCI) states and a TCI-field codepoint mapping, wherein an active subset of the set of TCI states is active in accordance with a default configuration; and communicating, based at least in part on the TCI-field codepoint mapping and the default configuration, using a default active TCI state of the active subset of the set of TCI states.

Aspect 13: The method of Aspect 12, wherein transmitting the configuration information comprises: transmitting the configuration information in radio resource control signaling.

Aspect 14: The method of any of Aspects 12 to 13, wherein the active subset of the set of TCI states includes a sequentially first one or more TCI states based at least in part on the default configuration.

Aspect 15: The method of any of Aspects 12 to 14, wherein the active subset of the set of TCI states includes one or more default active TCI states with one or more lowest TCI state codepoint indices in the TCI-field codepoint mapping.

Aspect 16: The method of any of Aspects 12 to 15, wherein a quantity of default active TCI states in the active subset of the set of TCI states is based at least in part on the configuration information.

Aspect 17: The method of any of Aspects 12 to 16, wherein communicating using the default active TCI state comprises: transmitting a downlink transmission using the default active TCI state in accordance with a timing criterion for applying the TCI-field codepoint mapping.

Aspect 18: The method of Aspect 17, wherein the timing criterion is a threshold amount of time after receiving the configuration information.

Aspect 19: The method of Aspect 17, further comprising: receiving an acknowledgment message associated with transmitting the configuration information, wherein the timing criterion is a threshold amount of time after receiving the acknowledgment message associated with transmitting the configuration information.

Aspect 20: The method of Aspect 17, further comprising: transmitting downlink control information with a transmission configuration indicator field identifying at least one TCI state of the active subset of the set of TCI states based at least in part on the timing criterion being satisfied.

Aspect 21: The method of Aspect 20, wherein the default active TCI state for a downlink transmission is based at least in part on the at least one TCI state of the active subset of the set of TCI states identified in the transmission configuration indicator field of the downlink control information.

Aspect 22: The method of any of Aspects 12 to 21, wherein communicating comprises: transmitting a downlink transmission that is quasi-co-located with a synchronization signal block associated with an initial access procedure.

Aspect 23: An apparatus for wireless communication at a device, comprising a processor; memory coupled with the processor; and instructions stored in the memory and executable by the processor to cause the apparatus to perform the method of one or more of Aspects 1-11.

Aspect 24: A device for wireless communication, comprising a memory and one or more processors coupled to the memory, the one or more processors configured to perform the method of one or more of Aspects 1-11.

Aspect 25: An apparatus for wireless communication, comprising at least one means for performing the method of one or more of Aspects 1-11.

Aspect 26: A non-transitory computer-readable medium storing code for wireless communication, the code comprising instructions executable by a processor to perform the method of one or more of Aspects 1-11.

Aspect 27: A non-transitory computer-readable medium storing a set of instructions for wireless communication, the set of instructions comprising one or more instructions that, when executed by one or more processors of a device, cause the device to perform the method of one or more of Aspects 1-11.

Aspect 28: An apparatus for wireless communication at a device, comprising a processor; memory coupled with the processor; and instructions stored in the memory and executable by the processor to cause the apparatus to perform the method of one or more of Aspects 12-22.

Aspect 29: A device for wireless communication, comprising a memory and one or more processors coupled to the memory, the one or more processors configured to perform the method of one or more of Aspects 12-22.

Aspect 30: An apparatus for wireless communication, comprising at least one means for performing the method of one or more of Aspects 12-22.

Aspect 31: A non-transitory computer-readable medium storing code for wireless communication, the code comprising instructions executable by a processor to perform the method of one or more of Aspects 12-22.

Aspect 32: A non-transitory computer-readable medium storing a set of instructions for wireless communication, the set of instructions comprising one or more instructions that, when executed by one or more processors of a device, cause the device to perform the method of one or more of Aspects 12-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
    at least one processor; and
    at least one memory communicatively coupled with the at least one processor and storing processor-readable code that, when executed by the at least one processor, is configured to cause the UE to:
        receive configuration information identifying a set of transmission configuration indicator (TCI) states, a TCI-field codepoint mapping, and an active subset of the set of TCI states, wherein the active subset of the set of TCI states is active in accordance with a default configuration, and wherein the active subset of the set of TCI states includes a sequentially first one or more TCI states based at least in part on the default configuration; and
        communicate, based at least in part on the TCI-field codepoint mapping and the default configuration, using a default active TCI state of the active subset of the set of TCI states.

2. The UE of claim 1, wherein, to cause the UE to receive the configuration information, the processor-readable code, when executed by the at least one processor, is configured to cause the UE to receive the configuration information in radio resource control signaling.

3. The UE of claim 1, wherein a quantity of default active TCI states in the active subset of the set of TCI states is based at least in part on the configuration information.

4. The UE of claim 1, wherein, to cause the UE to communicate using the default active TCI state, the processor-readable code, when executed by the at least one processor, is configured to cause the UE to receive a downlink transmission using the default active TCI state in accordance with a timing criterion for applying the TCI-field codepoint mapping.

5. The UE of claim 4, wherein the timing criterion is a threshold amount of time after receiving the configuration information.

6. The UE of claim 4, wherein the processor-readable code, when executed by the at least one processor, is configured to cause the UE to transmit an acknowledgment message associated with receiving the configuration information, wherein the timing criterion is a threshold amount of time after transmitting the acknowledgment message associated with receiving the configuration information.

7. The UE of claim 4, the processor-readable code, when executed by the at least one processor, is configured to cause the UE to receive downlink control information with a transmission configuration indicator field identifying at least one TCI state of the active subset of the set of TCI states based at least in part on the timing criterion being satisfied.

8. The UE of claim 7, wherein the default active TCI state for the downlink transmission is based at least in part on the at least one TCI state of the active subset of the set of TCI states identified in the transmission configuration indicator field of the downlink control information.

9. The UE of claim 1, wherein, to cause the UE to communicate, the processor-readable code, when executed by the at least one processor, is configured to cause the UE to receive a downlink transmission that is quasi-co-located with a synchronization signal block associated with an initial access procedure.

10. A network entity for wireless communication, comprising:
at least one processor; and
at least one memory communicatively coupled with the at least one processor and storing processor-readable code that, when executed by the at least one processor, is configured to cause the network entity to:
transmit configuration information identifying a set of transmission configuration indicator (TCI) states, a TCI-field codepoint mapping, and an active subset of the set of TCI states, wherein the active subset of the set of TCI states is active in accordance with a default configuration, and wherein the active subset of the set of TCI states includes a sequentially first one or more TCI states based at least in part on the default configuration; and
communicate, based at least in part on the TCI-field codepoint mapping and the default configuration, using a default active TCI state of the active subset of the set of TCI states.

11. The network entity of claim 10, wherein, to cause the network entity to transmit the configuration information, the processor-readable code, when executed by the at least one processor, is configured to cause the network entity to transmit the configuration information in radio resource control signaling.

12. The network entity of claim 10, wherein a quantity of default active TCI states in the active subset of the set of TCI states is based at least in part on the configuration information.

13. The network entity of claim 10, wherein, to cause the network entity to communicate using the default active TCI state, the processor-readable code, when executed by the at least one processor, is configured to cause the network entity to transmit a downlink transmission using the default active TCI state in accordance with a timing criterion for applying the TCI-field codepoint mapping.

14. The network entity of claim 13, wherein the timing criterion is a threshold amount of time after receiving the configuration information.

15. The network entity of claim 13, wherein the processor-readable code, when executed by the at least one processor, is configured to cause the network entity to receive an acknowledgment message associated with transmitting the configuration information, wherein the timing criterion is a threshold amount of time after receiving the acknowledgment message associated with transmitting the configuration information.

16. The network entity of claim 13, wherein the processor-readable code, when executed by the at least one processor, is configured to cause the network entity to transmit downlink control information with a transmission configuration indicator field identifying at least one TCI state of the active subset of the set of TCI states based at least in part on the timing criterion being satisfied.

17. The network entity of claim 16, wherein the default active TCI state for the downlink transmission is based at least in part on the at least one TCI state of the active subset of the set of TCI states identified in the transmission configuration indicator field of the downlink control information.

18. The network entity of claim 10, wherein, to cause the network entity to communicate, the processor-readable code, when executed by the at least one processor, is configured to cause the network entity to transmit a downlink transmission that is quasi-co-located with a synchronization signal block associated with an initial access procedure.

19. A method of wireless communication performed by a user equipment (UE), comprising:
receiving configuration information identifying a set of transmission configuration indicator (TCI) states, a TCI-field codepoint mapping, and an active subset of the set of TCI states, wherein the active subset of the set of TCI states is active in accordance with a default configuration, and wherein the active subset of the set of TCI states includes a sequentially first one or more TCI states based at least in part on the default configuration; and
communicating, based at least in part on the TCI-field codepoint mapping and the default configuration, using a default active TCI state of the active subset of the set of TCI states.

20. The method of claim 19, wherein receiving the configuration information comprises receiving the configuration information in radio resource control signaling.

21. The method of claim 19, wherein a quantity of default active TCI states in the active subset of the set of TCI states is based at least in part on the configuration information.

22. The method of claim 19, wherein communicating using the default active TCI state further comprises receiving a downlink transmission using the default active TCI state in accordance with a timing criterion for applying the TCI-field codepoint mapping.

23. The method of claim 22, wherein the timing criterion is a threshold amount of time after receiving the configuration information.

24. The method of claim 22, further comprising:
transmitting an acknowledgment message associated with receiving the configuration information, wherein the timing criterion is a threshold amount of time after transmitting the acknowledgment message associated with receiving the configuration information.

25. A method of wireless communication performed by a network entity, comprising:

transmitting configuration information identifying a set of transmission configuration indicator (TCI) states, a TCI-field codepoint mapping, and an active subset of the set of TCI states, wherein the active subset of the set of TCI states is active in accordance with a default configuration, and wherein the active subset of the set of TCI states includes a sequentially first one or more TCI states based at least in part on the default configuration; and communicating, based at least in part on the TCI-field codepoint mapping and the default configuration, using a default active TCI state of the active subset of the set of TCI states.

26. The method of claim 25, wherein transmitting the configuration information comprises transmitting the configuration information in radio resource control signaling.

27. The method of claim 25, wherein a quantity of default active TCI states in the active subset of the set of TCI states is based at least in part on the configuration information.

28. The method of claim 25, wherein communicating using the default active TCI state further comprises transmitting a downlink transmission using the default active TCI state in accordance with a timing criterion for applying the TCI-field codepoint mapping.

29. The method of claim 28, wherein the timing criterion is a threshold amount of time after receiving the configuration information.

30. The method of claim 28, further comprising:

receiving an acknowledgment message associated with transmitting the configuration information, wherein the timing criterion is a threshold amount of time after receiving the acknowledgment message associated with transmitting the configuration information.

* * * * *